Sept. 8, 1959　　　D. L. JAFFE ET AL　　　2,903,584
SWEEP WAVEFORM GENERATOR
Filed Jan. 24, 1957　　　2 Sheets-Sheet 1

INVENTORS,
DAVID L. JAFFE &
ROBERT M. SPIEGEL.
BY
Harry M. Saragovitz
ATTORNEY

Sept. 8, 1959  D. L. JAFFE ET AL  2,903,584
SWEEP WAVEFORM GENERATOR
Filed Jan. 24, 1957  2 Sheets-Sheet 2
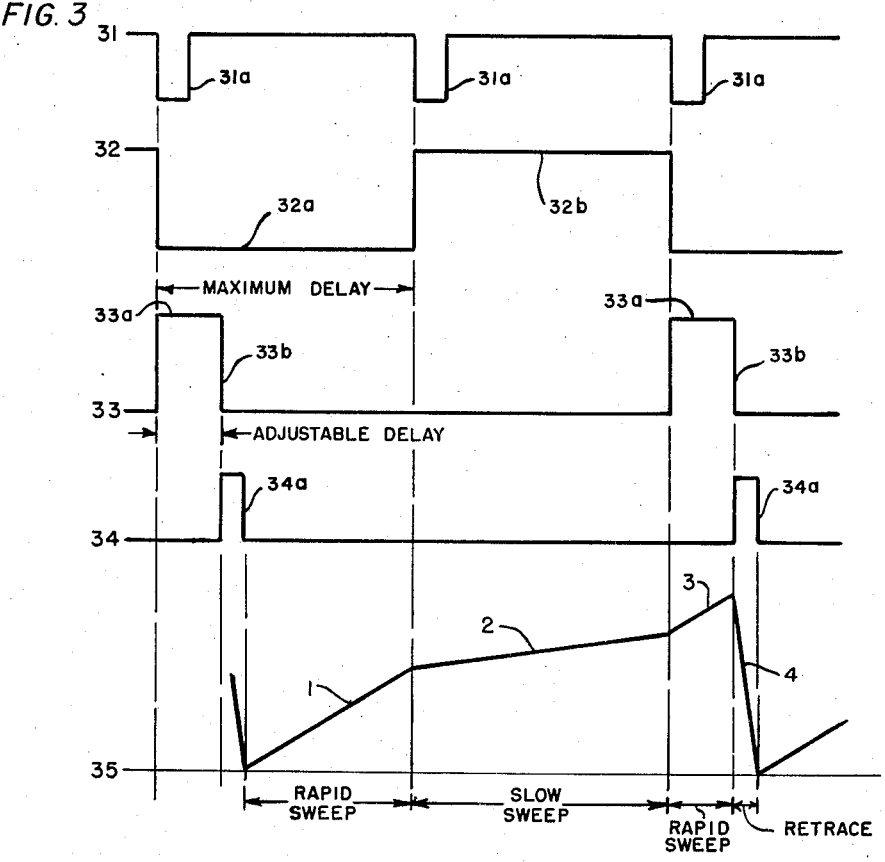
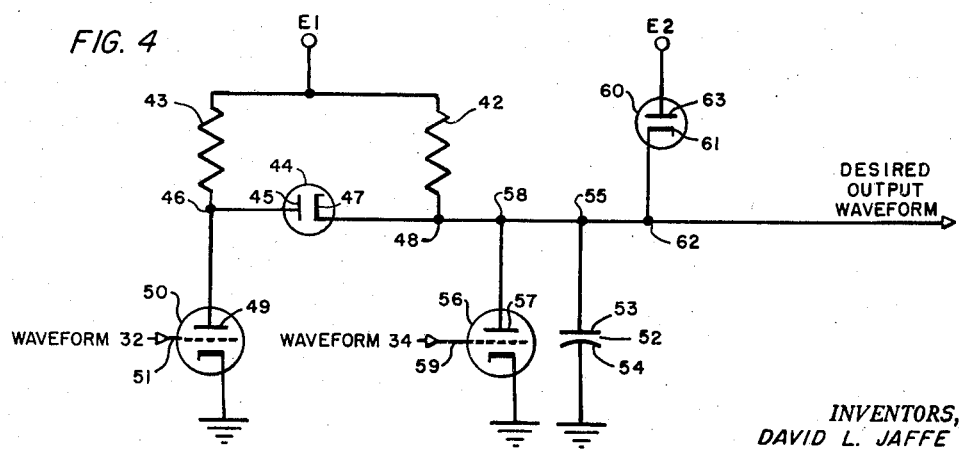
INVENTORS,
DAVID L. JAFFE &
ROBERT M. SPIEGEL.
BY
Harry M. Saragovitz
ATTORNEY.

United States Patent Office 2,903,584
Patented Sept. 8, 1959

2,903,584

SWEEP WAVEFORM GENERATOR

David L. Jaffe, Great Neck, N.Y., and Robert M. Spiegel, Philadelphia, Pa., assignors to the United States of America as represented by the Secretary of the Army Application January 24, 1957, Serial No. 636,219

3 Claims. (Cl. 250—27)

This invention relates to oscillographic display apparatus, and more particularly, to a sweep waveform generator for producing a sweep waveform suitable for use with cathode ray oscilloscopes.

In the field of oscillographic display of electrical signals it often becomes desirable to enlarge or magnify a portion of the phenomenon under investigation. This application discloses a sweep waveform generator for producing a sweep waveform having an expanded section which can be adjusted to cover any segment of the full display. The expansion herein referred to is not in space, but rather in time, i.e., the portion of the phenomenon to be expanded is investigated more slowly than the remainder.

It is an object of this invention to provide a sweep waveform generator for producing a sweep waveform having a rapid rate of change of sweep voltage over the beginning and ending portions thereof and a slow rate of change of sweep voltage over the intermediate portion.

It is a further object of this invention to provide a sweep waveform generator for producing a sweep waveform having a slow sweep portion adjustable along the time axis of the sweep waveform, the remaining portions along the time axis of the sweep waveform having a relatively rapid sweep.

The novel features of this invention are set forth with particularity in the appended claims. The invention itself, however, will be better understood by reference to the following description read in connection with the accompanying drawings in which:

Fig. 3 illustrates the waveforms which appear at various indicated portions of the sweep waveform generator; and Fig. 4 is a simplified schematic diagram of a portion of the sweep waveform generator.

A typical example of the application of the sweep waveform generator of this invention is in frequency spectrum analysis, where it may be desired to cover a large segment of spectrum with particular attention to some portion thereof. By slowly investigating the selected section, the highest possible degree of resolution may be achieved, without sacrificing range for the unexpanded portion of the investigation. In such an application, fullest possible advantage of the opportunity for high resolution may be secured by the concurrent adjustment of resolution filter bandwidth, the display of the expanded, high resolution portion on a separate display from the full range unexpanded portion, and other refinements.

Figure 1:
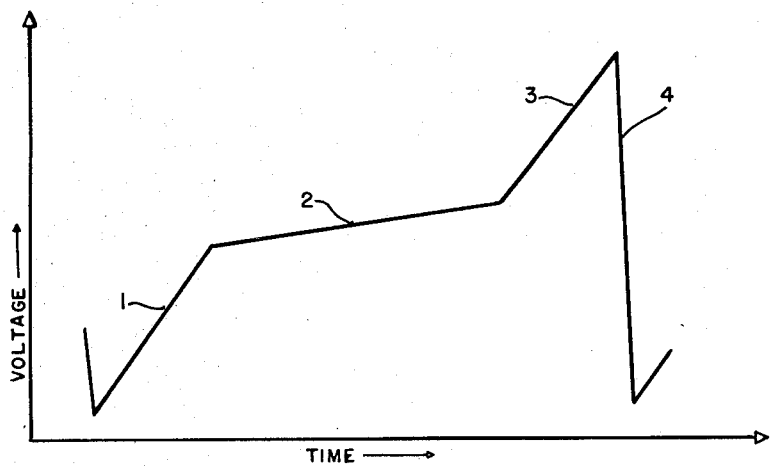
Fig. 1 illustrates one cycle of the sweep waveform produced.

Fig. 1 illustrates one complete cycle of the sweep waveform desired. Reference numeral 2 represents the expanded or slow sweep portion while reference numerals 1 and 3 represent the relatively rapid sweep portions and reference numeral 4 identifies the retrace. The smaller slope of the trace in portion 2 compared to portions 1 and 3 indicates a slow rate of change of sweep voltage in portion 2 and a relatively fast rate of change of sweep voltage in portions 1 and 3. In other words, the time rate of scan of the cathode ray beam in portion 2 is lower than the time rate of scan in portions 1 and 3. The time rate of scan in portion 1 is the same as in portion 3.

Figure 2:
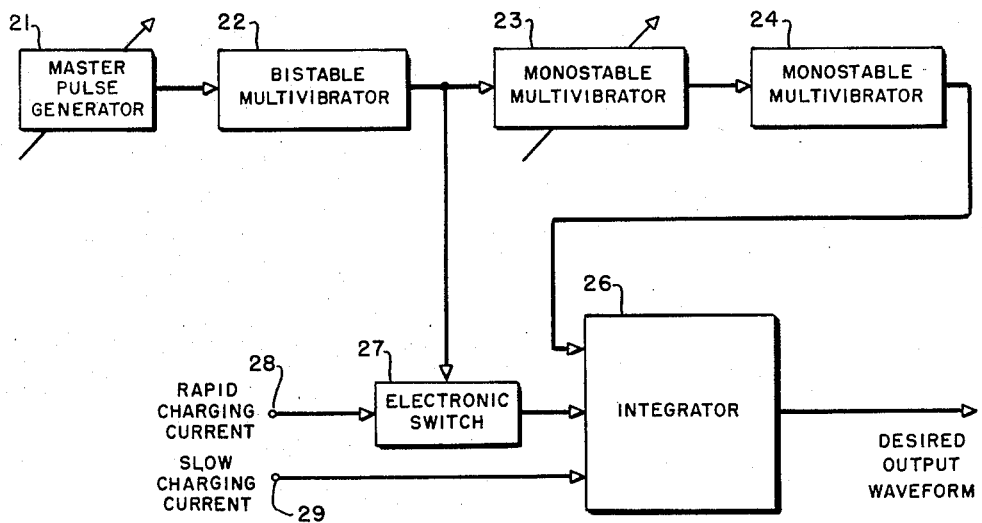
Fig. 2 is a simplified block diagram of the sweep voltage generator.

A simplified block diagram of a sweep waveform generator in accordance with this invention is shown in Figure 2.

A master pulse generator 21 emits a train of short pulses 31a (Fig. 3) at a rate adjustable at the operator's discretion. This rate is twice the frequency of the waveform cycle, as will be shown. The master pulse train is employed to trigger a bistable multivibrator 22 alternately between its two states, so that the multivibrator output is a square wave whose changes of potential coincide with the master pulses. In Figure 3, the train of short pulses 31a is illustrated as waveform 31 and the output of the bistable multivibrator 22 as waveform 32, comprising alternate negative and positive portions 32a and 32b.

The output of multivibrator 22, i.e., waveform 32, initiates the astable state of monostable multivibrator 23, whose output is illustrated in waveform 33 of Fig. 3 as a train of pulses 33a of variable length to provide the adjustable delay which controls the relative position of slow sweep portion 2, as will be shown.

As is evident from Fig. 2, multivibrator 23 generates a pulse 33a each time waveform 32 drops to its negative value, as at 32a, but is not triggered when waveform 32 rises to its positive value, as at 32b. The output of multivibrator 22 is also applied to electronic switch 27 to open and close the same in order to control the flow of rapid charging current to integrator 26. Upon termination of the astable period of monostable multivibrator 23, monostable multivibrator 24 is actuated, generating a short pulse 34a, coincident with trailing edge 33b of pulse 33a, as shown in waveform 34 of Fig. 3. Pulses 34a are applied to integrator 26, as shown in Fig. 2. Multivibrators 23 and 24 may be provided with peaking circuits to derive narrow trigger pulses from the leading and trailing edges of relatively wide rectangular input pulses 32a and 33a. See, for example, "Timing Circuits," NavShips 900,013, May 1, 1944, pages 37–39 inclusive. Multivibrators in general are disclosed in volume 19 of MIT Radiation Laboratory Series, first edition, at pages 159–204.

Waveforms 31 to 34 are used to form waveform 35, the desired output of the sweep waveform generator. This is accomplished by providing a charging current, which increases at a relative rapid rate, from source 28 to integrator 26 via electronic switch 27, which is opened and closed by the square wave output 32 of bistable multivibrator 22. Concurrently, a charging current from source 29, which increases at a relatively slow rate, is continuously applied to integrator 26. Once each cycle the integrator is reset or discharged, by application thereto of the short pulse 34a formed by monostable multivibrator 24.

Thus, the desired waveform is generated as follows. For the time delineated as 1 in Figures 1 and 3, switch 27 is held open by the negative portion 32a of waveform 32 so that both the slow and the rapid charging currents are applied to integrator 26. Therefore, the integrator output voltage rises at a constant rate. When the square wave 32 rises to its positive value, switch 27 is closed, and the rapid charging current component is interrupted, leaving only the slow charging current available to integrator 26, so that its output voltage continues to rise for the duration of positive portion 32b but at a slower rate. This is the interval marked as 2 in Figures 1 and 3. Upon restoration of waveform 32 to its negative value, the rapid charging current once more flows into integrator 26, causing its output voltage to rise at the same rate in 3 as it did in 1. Finally, upon generation of discharge pulse 34a by multivibrator 23, the integrator 26 output voltage is reset to its initial value, forming the retrace 4 and a new cycle begins.

It should be emphasized that the position of slow sweep portion 2 along the time axis of one cycle of the sweep waveform is controlled by varying the time positions of the beginning and ending of the cycle relative to portion 2. Put another way, the lengths of the rapid sweep portions are simultaneously varied to provide relative movement of the slow sweep portions. As can be seen from Fig. 3, adjustment of the delay of multivibrator 23 will shift the position of the trailing edge 33b of each of pulses 33a which, in turn will shift the position of each discharge pulse 34a, thereby varying the time position of the retrace and consequently the time positions of the beginning and ending of each cycle. Since the position of slow sweep portion 2 does not vary from cycle to cycle, being controlled by the positive portion 32b of waveform 32, any variation in the time positions of the beginning and ending of each cycle will vary the lengths of rapid sweep portions 1 and 3, thereby providing relative movement of the slow sweep portion 2 along the time axis of the sweep waveform. Manifestly, the lengths of rapid sweep portions 1 and 3 vary in opposite directions, i.e., one decreases while the other increases.

It should be noted that the time duration of the expanded or slow sweep portion 2 will remain equal to the duration of the remainder of the cycle even though the time of the total period may be changed by an increase or decrease in frequency since the time duration of slow sweep portion 2 is controlled by positive portion 32b which will be equal to one half of a full cycle regardless of frequency.

Fig. 4 is a simplified, schematic diagram of a preferred embodiment of integrator 26, the slow and rapid charging means therefor and switch 27. The integration is accomplished by capacitor 52, inasmuch as the voltage drop of a capacitor is given by the product of its reciprocal capacitance, a constant, and the time integral of the current passed into it, neglecting leakage and other losses.

The slow charging current is derived from the power supply potential E1 via a high resistance 42. The rapid charging current is derived from E1, medium resistor 43 and diode 44. One end of resistor 43 and anode 45 of diode 44 are connected to point 46. Similarly, one end of resistor 42 and cathode 47 of diode 44 are connected to point 48. Anode 49 of switching triode 50 is also connected to point 46 in order to control conduction of diode 44 when waveform 32 is applied to grid 51 thereof. Upper plate 53 of capacitor 52 is connected to point 55. Anode 57 of discharge triode 56 is connected to point 58 between points 48 and 55 in order to discharge capacitor 52 when a discharge pulse 34a is applied to grid 59 thereof. The cathodes of triodes 50 and 56 and lower plate 54 of capacitor 52 are connected to a common point such as ground.

In the operation of the circuit so far described, waveform 32 is applied to grid 51 of triode 50. When waveform 32 is negative, as at 32a, triode 50 is cut off, the resulting rise in plate potential being reflected at point 46 which is connected to anode 45 of diode 44. As a result, anode 45 of diode 44 is at a more positive potential than cathode 47, allowing the diode to conduct so that both the rapid charging current via resistor 43 and the slow charging current via resistor 42 begin charging capacitor 52, giving rise to rapid sweep portion 1. Since the voltage excursions of capacitor 52 are small in comparison to the voltage difference appearing across resistor 42, the charging currents are substantially constant throughout a cycle of operation. When waveform 32 rises to its positive value, as at 32b, triode 50 conducts heavily, reducing its anode potential below that appearing across capacitor 52. Thus, anode 45 is now at a more negative potential than cathode 47 and diode 44 ceases conduction, giving rise to the switching action whereby the rapid charging current is cut off, allowing only the slow charging current to flow to capacitor 52, resulting in slow sweep portion 2. When waveform 32 again falls to its negative value, the rapid sweep portion 3 is generated until the cycle is ended by a pulse 34a, as will now be shown.

Waveform 34 is applied to grid 59 of triode 56. Pulse 34a causes triode 56 to conduct heavily. Since anode 57 is connected to capacitor 52, conduction of triode 56 discharges the capacitor, forming retrace 4.

Although the circuit so far described will produce a sweep waveform satisfactorily, a further refinement may be added. As shown in Fig. 4, anode 63 of diode 60 is connected to voltage source E2 while the cathode 61 is connected to point 62. If, near the end of the retrace, for example, the discharge triode 56 should reduce the potential of capacitor 52 below E2, cathode 61 will be at a lower potential than anode 63 and diode 60 will conduct so that the voltage at the end of the retrace will not fall below E2. This refinement is introduced to assure that triode 50 and diode 44 will perform the switching action even though required very early in the sweep cycle when condenser 52 has just begun to charge. By maintaining the potential at E2 early in the sweep cycle, the potential of cathode 47 of diode 44 will be higher than that of anode 45 even though triode 50 is caused to conduct heavily substantially at the beginning of the sweep cycle.

Of course, the parameters of the circuit may be chosen such that the potential of capacitor 52 will not be less than the potential L2 after the first few cycles, in which case the diode 60 may be omitted.

While described with reference to the structure shown, this invention is not restricted to the details herein disclosed and this application is intended to cover such modifications or departures as may come within the scope of the following claims.

What is claimed is:

1. In a sweep waveform generator for producing a sweep waveform having a slow sweep portion, a first and second source of charging current having respective current outputs which increase at a relatively slow rate and at a relatively fast rate, and at least one fast sweep portion, a capacitor, said first source of charging current being connected to one terminal of said capacitor, a first electron discharge device having an anode and a cathode, said cathode being connected to said one terminal of said capacitor and said anode being connected to said second source of charging current, a second electron discharge device having an anode and a control electrode, said anode of said second electron discharge device being connected to the junction of said second source of charging current and said anode of said first electron discharge device, said control electrode being connected to a source of square wave voltage, said first electron discharge device conducting when said second electron discharge device is cut off by the negative portion of said square wave thereby charging said condenser from both said sources and said first electron discharge device being cut off when said second electron discharge device conducts heavily on the positive portion of said square wave thereby charging said condenser only from said first source of charging current.

2. Apparatus as defined in claim 1 further including a third electron discharge device having at least an anode and a control electrode, said anode being connected to said one terminal of said capacitor and said control electrode being connected to a source of pulses, said pulses causing said third electron discharge device to conduct thereby discharging said condenser to supply the retrace for said sweep waveform.

3. Apparatus as defined in claim 2 further including a fourth electron discharge device having a cathode and an anode, said cathode being connected to said one terminal of said capacitor and said anode being connected to a source of voltage, the value of which predetermines the minimum voltage at the end of said retrace.

References Cited in the file of this patent

UNITED STATES PATENTS

| | | | |
|---|---|---|---|
| 2,441,246 | Miller | May 11, | 1948 |
| 2,695,955 | Casey | Nov. 30, | 1954 |
| 2,735,008 | Scott | Feb. 14, | 1956 |